6. COMPOSITIONS, COATING OR PLASTIC.

Patented Oct. 6, 1925.

1,556,115

UNITED STATES PATENT OFFICE.

WILLIAM HOSKINS, OF CHICAGO, ILLINOIS, ASSIGNOR TO ECONOMY FUSE & MANUFACTURING COMPANY, OF CHICAGO, ILLINOIS, A CORPORATION OF NEW YORK.

PLASTIC.

No Drawing. Application filed February 21, 1923. Serial No. 620,502.

*To all whom it may concern:*

Be it known that I, WILLIAM HOSKINS, a citizen of the United States, residing at Chicago, in the county of Cook and State of Illinois, have invented new and useful Improvements in Plastics, of which the following is a specification.

In my prior application Ser. No. 452,953, filed March 17, 1921, issued as Patent 1,507,379, Sept. 2, 1924, I have described a plastic material containing an aluminate of a metal derived from the alkaline and alkaline earth groups as its sole (primary) cementitious constituent together with an inert or non-bonding filler, the material being caused to set or bond by the addition of a liquid containing phosphoric acid. The present invention relates to improvements in the type of plastic materials therein referred to and has among its objects the production of such plastic materials of high tensile strength at greatly reduced cost and the improvement of the characteristics of the cement (plastic) facilitating its commercial handling.

In accordance with the present invention there is incorporated into an inert or non-bonding filler a suitable proportion of a phosphatic material, such as bone ash, phosphate rock, or the like, together with sufficient sulfuric acid to react therewith and form the proportion of phosphoric acid necessary to cause the bonding or setting of the bonding constituent, which may be, for example, sodium aluminate or calcium aluminate.

The inert or non-bonding filler employed may be any suitable filler, either of dehydrating or non-dehydrating character, such as silica, crushed quartz, asbestos, aluminum oxide, or other material, the nature and characteristics of the various bonding agents having been fully set forth in the prior application above referred to.

In preparing a plastic material in accordance with the present invention, employing a phosphatic material and sulfuric acid, the desired proportion of phosphatic material is first thoroughly admixed with the filler to be employed. The necessary proportion of sulfuric acid for conversion of the phosphatic material and formation of phosphoric acid is then added, the violence of reaction being greatly reduced by the inert material present. The resulting mixture, which is normally powdery and dry to the touch, is then admixed with a suitable proportion of the bonding material, which may, for example, be calcium aluminate. The resulting mixture may be stored for a considerable period, the proper proportion of water being added when it is desired to employ the cement.

The proportion of phosphatic material to sulfuric acid should be at least the combining ratio; preferably an excess should be employed. The strength of sulfuric acid employed may be varied, various strengths from 93% to about 50% $H_2SO_4$ being found satisfactory in use. Preferably about 65% $H_2SO_4$ is employed. The proportion of the aluminate binder may be varied as disclosed in the prior application, for general technical purposes not exceeding 10% and ranging preferably from 1.5 to 4%. The total proportions of phosphatic material and sulfuric acid should be sufficient to provide a very considerable excess of phosphoric acid, say from 3 to 10 times the proportion necessary theoretically for combination with the binder.

In preparing the cement or plastic, the phosphatic material is first mixed with the filler, any suitable non-bonding filler being employed. Thus crushed quartz, asbestine, clay, etc. may be employed, the characteristics of the various fillers being more fully set forth in my prior application. The sulfuric acid is then intermixed with the filler and phosphatic material, and a dry, powdery mass is obtained. The binder, preferably calcium aluminate formed in the manner described in my prior application, may then be admixed with the mass. Setting or bonding does not take place until water sufficient to wet the particles of the mixture is added; hence the mixture including the binder may be stored or held for considerable periods before use. The amount of water added may vary from 6 to 12%.

It is to be noted that the products of reaction of the phosphatic material and the sulfuric acid, aside from the phosphoric acid, form a finely divided filler which appears to improve the characteristics of the product. Furthermore, a large excess of the phosphatic material may be employed as a filler, if desired.

The cement may be molded into forms in any desired manner. Where desired, a lubricant, such as a small proportion of kerosene, may be included in the mixture in the manner described in my prior application. The molded article may, if desired, be heated to accelerate its set, for example, to 100° to 180° C., as described in my prior application. It is frequently advantageous to "cure" the mixture plastic prior to molding it, the length of the period at which it is held varying with the temperature. Thus at 40 to 50° C. it may be held for one to two hours and at room temperature, one to two days.

The following examples illustrate the present invention, the method of admixture being already described:

1. Bone ash 13 to 18%; filler (quartz) 50 to 62%; sulfuric acid (66° Bé.) 11 to 17%; calcium aluminate (binder) 1.50 to 2.50%; aluminum oxide 2 to 4%; water 2 to 6%.

2. Bone ash 18 to 21.5%; quartz 53 to 60%; sulfuric acid 14 to 17%; aluminate binder 1.50 to 2%; aluminum oxide 2 to 2.5%; water 4 to 5.5%.

3. Phosphate rock, 14.5 to 19%; quartz 58 to 64%; sulfuric acid 12.5 to 16%; aluminate binder 2 to 4%; water 2 to 5%.

4. Bone ash 19 to 27%; asbestine 35 to 54%; sulfuric acid 15 to 19%; (ratio bone ash to sulfuric acid equal to from 1.05–1.24 to 1); calcium aluminate 1.5 to 3%; water 6 to 10%.

5. Bone ash 23.6%; asbestine 47.2%; sulfuric acid 17.8%; calcium aluminate 1.6%; aluminate 2.67%; water 7.21%. (The large excess of bone ash in this example acts as a filler.)

The specific details set forth in connection with these examples are intended to illustrate the invention, but not to be regarded as limitations on its scope.

I claim:

1. A plastic composition produced by the interaction of a phosphatic material, sulfuric acid and an aluminate binder.

2. A plastic composition produced by the interaction of a phosphatic material, sulfuric acid and 1 to 10% of an aluminate binder.

3. A plastic composition produced by the interaction of 1 to 10% of calcium aluminate, a phosphatic material and sulfuric acid, the proportions of the phosphatic material and sulfuric acid being sufficient to provide an excess of phosphoric acid over that required for reaction with the aluminate.

4. A plastic composition produced by the interaction of 1 to 10% of calcium aluminate, sulfuric acid, and phosphatic material in excess of that necessary for reaction with the sulfuric acid.

5. A plastic composition produced by the interaction of an inert binder, 1 to 10% of calcium aluminate, a phosphatic material and sulfuric acid, the proportion of the latter being sufficient to provide an excess of phosphoric acid over that required for reaction with the aluminate, and the proportion of phosphatic material being in excess of that required to react with the sulfuric acid.

6. A cementitious composition produced by the interaction of phosphate rock 14½ to 19%; a filler 58 to 64%; sulfuric acid 12½ to 16%; aluminate binder 2 to 4%.

7. The method of forming a plastic composition capable of setting on addition of water which consists in mixing a phosphatic material with an inert filler, adding sulfuric acid thereto and mixing an aluminate binder with the mixture.

8. The method of forming a plastic composition capable of setting on addition of water which consists in mixing a phosphatic material with an inert filler, adding sulfuric acid thereto, the proportion of phosphatic material being in excess of that required for reaction with the sulfuric acid, and mixing an aluminate binder in proportions of 1 to 10% with the mixture.

9. The method of forming a plastic composition which consists in mixing a phosphatic material with an inert filler, adding sulfuric acid thereto, mixing an aluminate binder with the mixture, incorporating water therein and curing the resulting mixture.

WILLIAM HOSKINS.